INVENTOR
M. F. REYNST
BY
AGENT

Patented Oct. 10, 1950

2,525,425

UNITED STATES PATENT OFFICE 2,525,425

PHASE SHIFTING BRIDGE

Maximilien Félix Reynst, Eindhoven, Netherlands, assignor to Hartford National Bank and Trust Company, Hartford, Conn., as trustee Application February 5, 1947, Serial No. 726,592
In the Netherlands May 15, 1944

Section 1, Public Law 690, August 8, 1946
Patent expires May 15, 1964

6 Claims. (Cl. 323—123)

The invention relates to a device for deriving from an alternating feed voltage an output voltage of variable phase.

A voltage of variable phase and whose amplitude is variable from zero to a definite value is desirable, for instance, in bringing into apparent equilibrium a measuring bridge arrangement located at a remote point. In this case the voltage whose amplitude and phase are variable is introduced into the measuring diagonal on the bridge circuit-arrangement.

For deriving a voltage of variable phase from a given alternating voltage, various solutions are known. However, practical constructions are comparatively complicated.

The invention provides a new way for deriving an output voltage of variable phase from an alternating feed voltage. The invention provides a device which, in a construction suited for practical purposes, is particularly cheap owing to the required small number of variable elements, and may be used in a wide range of frequencies.

According to the invention the output voltage of variable phase is obtained as a vectorial difference voltage of two auxiliary voltages. These auxiliary voltages are derived from the alternating feed voltage and are variable relatively to each other in amplitude and phase in such manner that, viewed in a vector diagram, the end of one auxiliary voltage vector is capable of describing a closed figure about the end of the other auxiliary voltage vector.

The device according to the invention proves to be advantageous, since the required phase displacement between the auxiliary voltages derived from the feed voltage is comparatively small and may at least be smaller than 90°.

Figure 1:
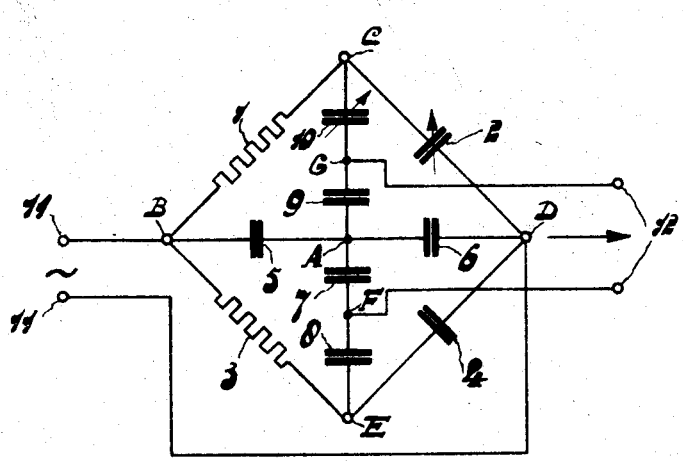
Figure 2:
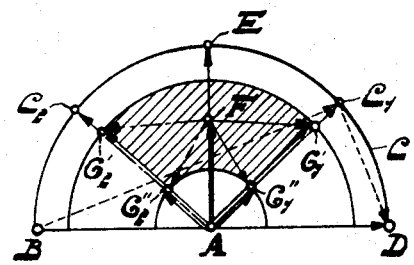
Figure 3:
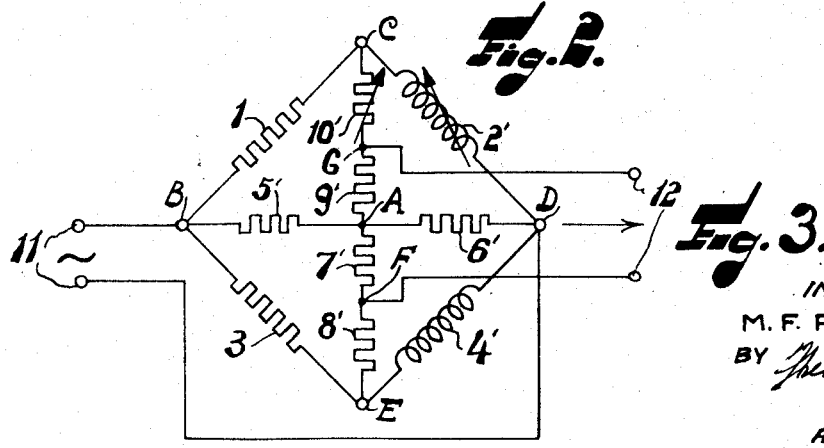

In order that the invention may be clearly understood and readily carried into effect it will now be described more fully with reference to the accompanying drawing, given by way of example and in which:

Figure 1 is a schematic diagram illustrating one form of circuit arrangement in accordance with the invention, Fig. 2 is a vector diagram of the voltages occurring in the circuit of Fig. 1, and Fig. 3 is a schematic diagram illustrating another form of circuit arrangement in accordance with the invention.

In the device shown in Fig. 1 an alternating feed voltage is supplied to the input terminals 11, to which terminals are connected three parallel-connected potentiometers. Two of these potentiometers each consist of the series-connection of a resistance 1 and 3 respectively, and a condenser 2 and 4 respectively. The third potentiometer consists of two condensers 5, 6 having the same size.

With the two first-mentioned potentiometers 1, 2 and 3, 4 respectively, voltages are set up at the condensers 2 and 4, respectively, which voltages are displaced in phase in the same direction relatively to the voltage set up at the condenser 6 of the third potentiometer.

For explaining the voltage ratios in the circuit arrangement represented in Fig. 1, Fig. 2 illustrates the associated vector diagram. The alternating feed voltage supplied to the three parallel-connected potentiometers lies between points B and D of the circuit arrangement shown in Fig. 1 and is represented by the vector BD in Fig. 2.

Since in this executional example the condensers 5, 6 have the same value, the voltage of the junction A of these condensers corresponds with a point A located at the middle of the vector BD.

The tapping points C and E of the phase-shifting potentiometers 1, 2 and 3, 4 respectively have voltages which depend, in amplitude and phase, on the composite parts of these potentiometers. Supposing the alternating current resistance of the resistance 3 and the condenser 4 to be the same with respect to the frequency of the feed voltage, the voltage of point E may be represented by point E in Fig. 2, which point is located at the middle of an arc of a circle having the vector BD as a diameter. Vectorial combination of the output voltages of the potentiometers 3, 4 and 5, 6 yields the combination voltage set up between points A and E and corresponding with the vector AE, the said combination voltage being perpendicular to the vector BD.

Combination of the output voltages of the potentiometers 1, 2 and 5, 6 yields between points A and C the voltage AC which is such that the end of this vector AC also lies on the arc having the vector BD as a diameter. However, point C in the vector diagram may be shifted on the arm BD by regulating the value of the condenser 2. In one extreme position the point C1, and in the other extreme position the point C2 is reached.

For obtaining the output voltage, the phase of which is variable at will, two auxiliary voltages are derived from the two combination voltages AE and AC in the following manner.

The voltage AE is supplied to a potentiometer consisting of two condensers 7, 8 having the same value. Thus a voltage is set up at the condenser 7 which may be represented by the vector AF and constitutes one of the aforesaid auxiliary voltages.

For obtaining the other auxiliary voltage, the voltage AC is also supplied to a potentiometer consisting of two condensers 9, 10 and whose potentiometer-ratio is regulable by means of the condenser 10. If a voltage between points A and C corresponds with the vector AC₁, the voltage between points A and G, which constitutes the other of the two auxiliary voltages, acquires a value between the values denoted by $AG_1'$ and $AG_1''$ in Fig. 2. This may be achieved by adjusting the value of condenser 10. Similarly, by regulating the condenser 10, this voltage will attain a value between $AG_2'$ and $AG_2''$, if the voltage between the points A and C corresponds with the vector AC₂.

In view of the foregoing, it will be obvious that by means of the variable condensers 2 and 10, the auxiliary voltage AG is variable in such a manner that the end G of the voltage vector AG is located at any desired point of the cross-hatched plane limited by the straight line $G_1'G_1''$, the arc $G_1''G_2''$, the straight line $G_2''G_2'$ and the arc $G_2'G_1'$. As appears from Fig. 2 the end of the vector AF is located within the outlines of this plane so that the difference voltage of the auxiliary voltage vectors AF and AG, i. e. the vector FG in Fig. 2, may have any desired phase. Now this voltage is supplied as an output voltage to the terminals 12 of the device shown in Fig. 1.

In the represented form of construction, all potentiometers, except the phase-shifting potentiometers, consist solely of condensers. This form of construction has the advantage that the ohmic losses in the circuit according to the invention are extremely low. It will be appreciated, however, that the use of capacitative potentiometers is not essential for the invention. For instance, all condensers of the represented circuit arrangement may be replaced by inductors. Furthermore it is possible, for instance, to design one or more of the potentiometers 5, 6; 7, 8 and 9, 10 as ohmic potentiometers. Such a modification of the circuit of Fig. 1 is shown in Fig. 3.

Finally it is pointed out that, for attaining the desired results, very different forms of construction are possible within the scope of the present invention. In any instance two auxiliary voltages are derived from a given alternating feed-voltage, the phase and amplitude of these auxiliary voltages being variable with respect to each other in such manner as to permit the end of one auxiliary voltage vector, as shown in Fig. 2, to describe a closed figure about the end of the other auxiliary voltage vector.

What I claim is:

1. A phase shifting circuit arrangement comprising a pair of input terminals, a first impedance network connected across said terminals and having a resistive element and a reactance element connected in series and a tap at said series connection, a second impedance network connected across said terminals and having a tap, a third impedance network connected across said terminals and having a resistive element and a variable reactance element connected in series and a tap at said series connection, a fourth impedance having a tap and connected between the said tap on said first impedance network and the said tap on said second impedance network, a fifth impedance having a tap and connected between the said tap on said third impedance network and said tap on said second impedance network, a pair of output terminals, and a connection between said output terminals and said taps of the fourth and fifth networks.

2. A phase shifting circuit arrangement comprising a pair of input terminals, a first impedance network connected across said terminals and having a resistive element and a reactance element connected in series and a tap at said series connection, a second impedance network connected across said terminals and having a tap, a third impedance network connected across said terminals and having a resistive element and a variable reactance element connected in series and a tap at said series connection, a fourth impedance having a tap and connected between the said tap on said first impedance network and the said tap on said second impedance network, a fifth impedance network having a fixed and a variable impedance element connected in series and a tap at said series connection, a connection of said fifth impedance network between the said tap on said third impedance network and said tap on said second impedance network, a pair of output terminals, and a connection between said output terminals and said taps of the fourth and fifth impedance networks.

3. A phase shifting circuit arrangement comprising a pair of input terminals, a first impedance network connected across said terminals and having a resistive element and a capacitive element connected in series and a tap at said series connection, a second impedance network connected across said terminals and having a center tap, a third impedance network connected across said terminals and having a resistive element and a variable capacitive element connected in series and a tap at said series connection, a fourth impedance having a tap and connected between the said tap on said first impedance network and the said tap on said second impedance network, a fifth impedance network having a fixed and a variable impedance element connected in series and a tap at said series connection, a connection of said fifth impedance network between the said tap on said third impedance network and said tap on said second impedance network, a pair of output terminals, and a connection between said output terminals and said taps of the fourth and fifth impedance networks.

4. A phase shifting circuit arrangement comprising a pair of input terminals, a first impedance network connected across said terminals and having a resistive element and an inductive element connected in series and a tap at said series connection, a second impedance network connected across said terminals and having a center tap, a third impedance network connected across said terminals and having a resistive element and a variable inductance element connected in series and a tap at said series connection, a fourth impedance having a tap and connected between the said tap on said first impedance network and the said tap on said second impedance network, a fifth impedance network having a fixed and a variable impedance element connected in series and a tap at said series connection, a connection of said fifth impedance network between the said tap on said third impedance network and said tap on said second impedance network, a pair of output terminals, and a connection between said output terminals and said taps of the fourth and fifth impedance networks.

5. A phase shifting circuit arrangement comprising a pair of input terminals, a first impedance network connected across said terminals and having a resistive element and a reactance element connected in series and a tap at said series connection, a second impedance network connected across said terminals and having two capacitive elements connected in series and a tap at said series connection, a third impedance network connected across said terminals and having a resistive element and a variable reactance element connected in series and a tap at said series connection, a fourth impedance having a tap and connected between the said tap on said first impedance network and the said tap on said second impedance network, a fifth impedance network having a fixed and a variable impedance element connected in series and a tap at said series connection, a connection of said fifth impedance network between the said tap on said third impedance network and said tap on said second impedance network, a pair of output terminals, and a connection between said output terminals and said taps of the fourth and fifth impedance networks.

6. A phase shifting circuit arrangement comprising a pair of input terminals, a first impedance network connected across said terminals and having a resistive element and a reactance element connected in series and a tap at said series connection, a second impedance network connected across said terminals and having a tap, a third impedance network connected across said terminals and having a resistive element and a variable reactance element connected in series and a tap at said series connection, a fourth impedance having two capacitive elements connected in series and a tap at said series connection, a connection of said fourth impedance network between the said tap on said first impedance network and the said tap on said second impedance network, a fifth impedance having a fixed and a variable capacitive element connected in series, a tap at said series connection, a connection to said fifth impedance network between the said tap on said third impedance network and said tap on said second impedance network, a pair of output terminals, and a connection between said output terminals and said taps of the fourth and fifth impedance networks.

MAXIMILIEN FÉLIX REYNST.

REFERENCES CITED

The following references are of record in the file of this patent:

UNITED STATES PATENTS

| Number | Name | Date |
|---|---|---|
| 2,004,613 | Meacham | June 11, 1935 |
| 2,042,234 | Lyle | May 26, 1936 |
| 2,126,265 | Knoop | Aug. 9, 1938 |
| 2,189,569 | Moe | Feb. 6, 1940 |
| 2,229,450 | Garman | Jan. 21, 1941 |
| 2,255,502 | Bousman | Sept. 9, 1941 |